United States Patent [19]
Häussler et al.

[11] Patent Number: 5,578,750
[45] Date of Patent: Nov. 26, 1996

[54] SENSOR FOR MAGNETICALLY SCANNING A MOVING ELEMENT IN AN INTERNAL COMBUSTION ENGINE

[75] Inventors: Axel Häussler, Zürich; Marcel Weder, Sulgen, both of Switzerland

[73] Assignee: New Sulzer Diesel AG, Winterthur, Switzerland

[21] Appl. No.: 522,774

[22] Filed: Sep. 1, 1995

[30] Foreign Application Priority Data

Oct. 3, 1994 [EP] European Pat. Off. ............. 94810574

[51] Int. Cl.$^6$ ............. G01M 15/00; G01B 7/14; G01N 27/72
[52] U.S. Cl. ............. 73/120; 92/5 R; 324/207.16; 324/229; 324/262
[58] Field of Search ............. 324/173, 174, 324/207.15, 207.16, 207.24, 207.25, 207.26, 228, 229, 239, 240, 262; 92/5 R; 123/414, 617; 73/120, 661

[56] References Cited

U.S. PATENT DOCUMENTS

| | | | |
|---|---|---|---|
| 4,385,297 | 5/1983 | Schmitt et al. | 324/207.16 X |
| 4,839,591 | 6/1989 | Nomura et al. | 324/207.24 X |
| 5,455,509 | 10/1995 | Semura et al. | 324/207.24 |

FOREIGN PATENT DOCUMENTS

| | | | |
|---|---|---|---|
| 16037 | 4/1971 | Japan | 324/173 |
| 53503 | 3/1986 | Japan | 324/207.16 |

OTHER PUBLICATIONS

Patent Abstracts of Japan, vol. 15, No. 308 (E–1097), Aug. 7, 1991 & JP-A-03 109 816 (Sunx Ltd.) May 9, 1991; Abstract.
Patent Abstracts of Japan, vol. 18, No. 356 (P–1765) Jul. 5, 1994 & JP-A-06 094 684 (Sumitomo Metal Ind. Ltd.) Apr. 8, 1994; Abstract.
Patent Abstracts of Japan, vol. 15, No. 491 (M–1190) Dec. 12, 1991 & JP-A-03 213 641 (Isuzu Ceramics Kenkyusho : KK) Sep. 19, 1991; Abstract.

*Primary Examiner*—Gerard R. Strecker
*Attorney, Agent, or Firm*—Townsend and Townsend and Crew

[57] ABSTRACT

A sensor has a magnetic circuit and an electric circuit for scanning the passage of magnetizable and non-magnetizable material of relatively movable parts. The sensor has a housing made of first and second parts which define an interface between them. The first part of the housing can be mounted to a cylinder wall and includes a portion of a magnetic core. A remaining portion of the magnetic core is embedded in the second housing part and an electric circuit operatively coupled with the magnetic core is mounted entirely in the second housing part so that the interface between the housing parts is free of electrical contacts to thereby prevent signal degradation due to contamination of electrical contacts.

14 Claims, 2 Drawing Sheets

SENSOR FOR MAGNETICALLY SCANNING A MOVING ELEMENT IN AN INTERNAL COMBUSTION ENGINE

BACKGROUND OF THE INVENTION

The invention relates to a device for scanning a moving element and an internal combustion piston engine having piston rings on the piston which are provided with the element and with such a device.

In the case of large diesel engines, it is known to receive data or information concerning the condition of the piston rings with the aid of a signal generated by a proximity sensor. In order to accomplish this, the piston rings have an insert made from a non-magnetizable material, and a sampling device is provided in the cylinder liner. This sampling device contains a magnet core with a winding which is arranged in a housing. The magnet core is arranged in the housing such that its pole surfaces are isolated and that there is direct operating connection with the insert. The ends of the winding are guided out of the housing and connected to an evaluating device via a plug device. This sampling device is susceptible to faults since the voltage changes brought about by the magnetic field change are transferred to the evaluation device via electric plug elements which are sensitive to contamination.

SUMMARY OF THE INVENTION

It is therefore an object of the present invention to remedy the shortcomings of the prior art by relocating the interface into the magnetic circuit in order to achieve an energy transfer protected against contamination and thus to accomplish a safe signal transfer.

By forming the point of separation with a projection and a recess, a form locked connection can be achieved at the interface. A magnetic circuit formed as a strip-wound cut core has the advantage that a high-frequency voltage can be applied and that a better signal transfer is thus achieved.

The magnetic circuit is arranged at the engine in a position-stable manner in an internal combustion piston engine, and the electric circuit is releasably connected to the magnetic circuit.

In order to achieve this, it is advantageous that there are no electric contacts which are sensitive to contamination in the immediate proximity of the engine and that the electric circuit is thermally shielded.

The embodiment of the magnetic circuit has the advantage that the sampling region determined by the pole surfaces is at a minimum and that an adaptation of the pole surfaces to the piston ring diameter is therefore not required.

DESCRIPTION OF THE PREFERRED EMBODIMENTS

Figure 1:
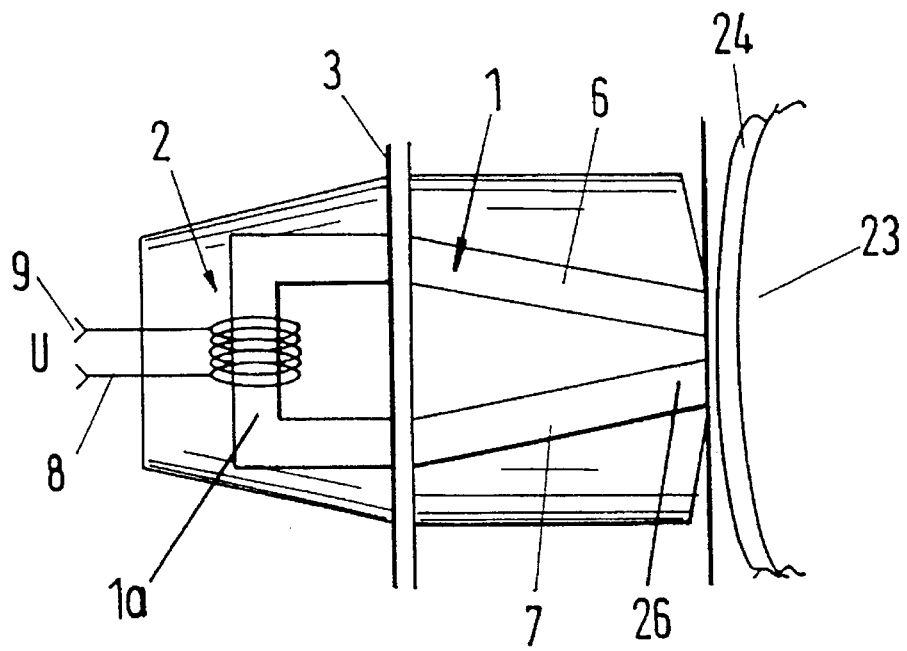
FIGS. 1 and 2 illustrate an embodiment of a device made in accordance with the invention in plan and side elevation views, respectively.

The figures show a preferred embodiment of the device which is used for a piston internal combustion machine in order to monitor the wear of the piston rings.

The device contains a substantially U-shaped magnetizable core 1 which forms a magnetic circuit, a winding 2 which forms the electric circuit, and a housing made from two parts 4, 5 determining an interface 3. The magnetic core is defined by the first and second magnet limbs 6, 7 and a yoke 1a which extends between the limbs.

The interface 3 is provided in the magnetic circuit 1, i.e. extends through the limbs 6, 7 of the magnet core 1. Through this division, the device is divided into an adapter 4 which can be assembled in a location fixed manner and into a connection part 5 which is connectable to the adapter 4.

Figure 3:
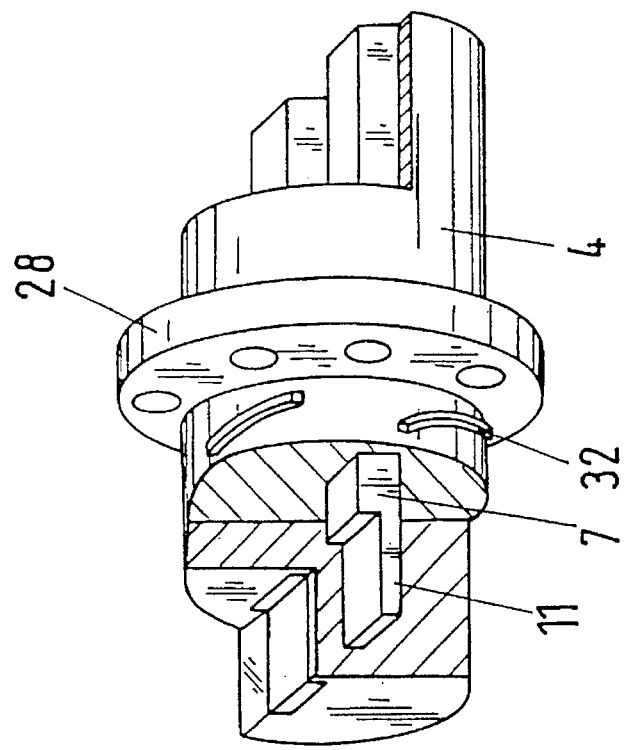
FIG. 3 is an exploded, a perspective view of the device.
Figure 3:
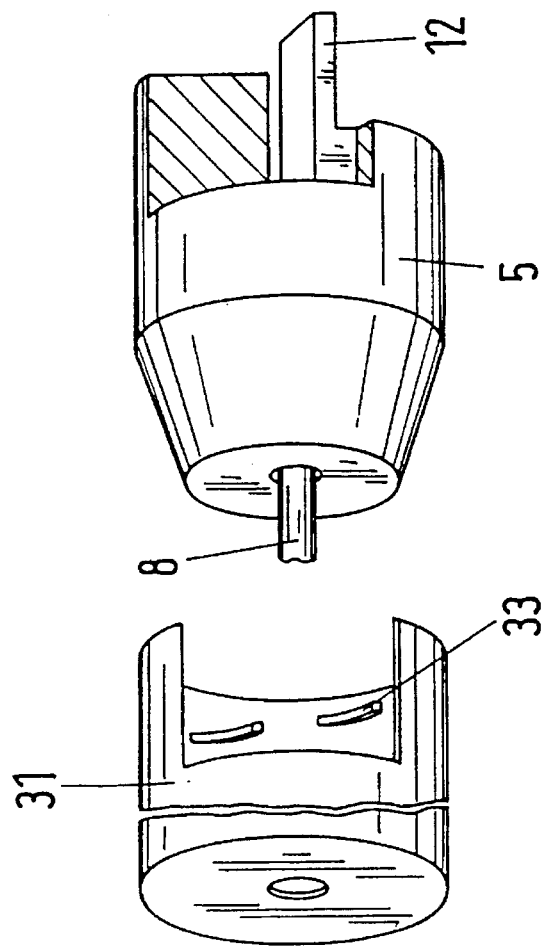

The housing parts 4, 5 consist of gray cast iron and have recesses (not represented) in which the limbs 6, 7 are arranged in a position-stable manner and are secured through suitable connection means, for example adhesive. In this connection, it is pointed out that other materials can be used aside from gray cast iron, as long as these are non-magnetizable. The mechanical interface 3 is formed as a projection and recess with insulated contact sections 11, 12 at the limbs 6, 7 (FIG. 3).

The magnetizable core 1 is a so-called strip-wound cut core which consists of layered strips and which is provided with an insulating layer made from phosphate. The ends of the winding 2 are connected to a line 8 which is guided from the connection part 5 and which has plug elements 9 at the end, in order to connect the device to an evaluation device.

As already mentioned, the device is preferably used with diesel engines for monitoring the wear of the piston rings. With these engines, a piston 21 executes a translatory movement (Arrow A) in a cylinder liner 22. A piston ring 23 is assembled in the piston 21 in a known manner, with the piston ring being provided with an insert 24 made from injection metal, in particular from a CU AL-alloy (FIG. 2).

Core 1 is a nonpermanent magnet which is magnetized by a DC signal "U" supplied to winding 2 by line 8. When piston ring 23 passes the pole ends 27 of the core, the magnetic flux changes. This generates an AC signal in coil 2 which is superimposed on the DC signal "U" and is used to monitor the piston ring.

Figure 2:
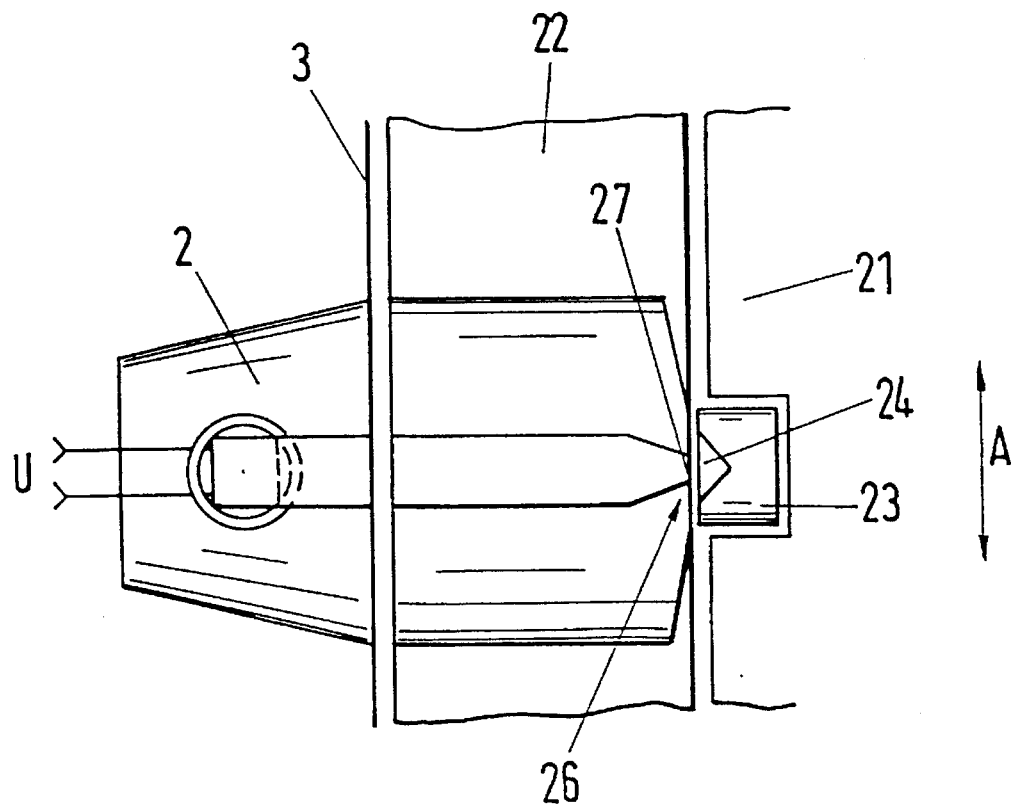

As can be seen from FIG. 1 and FIG. 2, the limbs 6, 7 are formed in a converging manner and have a section 26 which tapers towards their free end, in order to form the scanning region as small as possible.

The adapter 4 is set into the cylinder liner 21 and secured such that the pole ends 27 are arranged in a position-stable manner. In order to accomplish this, the adapter 4 is provided with a flange 28 (FIG. 3).

As FIG. 3 shows further, a cap 31 is provided in order to hold the connection part 5 at the adapter 4. Webs 32, 33 which can engage with one another are provided at the adapter 4 and at the cap 31, in order to fixedly clamp the cap 31 at the adapter.

The device comprises a magnetic circuit, defined by magnetizable core 1 and an electric circuit, defined by electrical winding 2, in order to scan a moved element 24. In order to ensure an energy transfer secure against contamination, an interface 3 is provided in the magnetic circuit.

The magnetic circuit is secured to the engine in a position-stable manner in a internal combustion piston engine, and the electric circuit is connectable to the magnetic circuit. This ensures a safe manner of operation of the device for monitoring the piston ring wear.

What is claimed is:

1. A device for electromagnetically scanning the passage of an element including magnetizable and non-magnetizable material moving relative to the device, the device comprising a magnetic circuit for placement in an operative position relative to the element, an electric circuit operatively coupled with the magnetic circuit for generating an output responsive to movement of the element relative to the magnetic circuit, and a housing having first and second parts defining an interface between them, the first part of the housing mounting a portion of the magnetic circuit and the second part of the housing mounting a remaining portion of the magnetic circuit and the entire electric circuit so that the electric circuit does not extend across the interface to thereby protect the generated output against degradation.

2. A device according to claim 1 wherein the first and second housing parts include a projection on one and a cooperating recess on the other one of the housing parts.

3. A device according to claim 1 wherein the magnetic circuit comprises a substantially U-shaped magnetic core.

4. A device according to claim 3 wherein the magnetic core includes first and second limbs and a yoke interconnecting the limbs, and wherein the limbs extend across the interface.

5. A device according to claim 4 wherein the yoke is horseshoe-shaped.

6. A device according to claim 4 wherein the limbs converge in a direction from the yoke of the magnetic core towards free ends of the limbs.

7. A device according to claim 3 wherein the magnetic core comprises a strip-wound cut core.

8. A device according to claim 1 wherein the first housing part includes components of the magnetic circuit and the second housing part includes components of the electric circuit, and further including means for releasably connecting the first and second housing parts to each other.

9. A sensor for generating a signal responsive to relative movement of a magnetically responsive element past the sensor, the sensor comprising a housing having first and second parts defining an interface between them and detachably joined to each other, a magnetic core having a first magnet section mounted to the first part and a second magnet section mounted to the second part so that, when the parts are joined to each other, the first and second magnet sections are magnetically coupled, and an electric circuit for generating the signal and operatively coupled to the second section of the magnet core so that the signal is generated when the element moves past the sensor, the electric circuit being wholly disposed in the second housing part, whereby contamination accumulating at the interface during use of the sensor is prevented from affecting a transmission of the signal through the electric circuit.

10. A sensor according to claim 9 wherein the interface is nonplanar, and wherein portions of the first and second magnet sections are formed to overlap and contact each other when the first and second housing parts are secured to each other.

11. An internal combustion engine comprising at least one piston, at least one piston ring carried by the piston and an element included in the piston ring made of magnetically responsive material, a cylinder wall defining a cylinder within which the piston reciprocates, a housing mounted to the cylinder wall at a position so that the element passes the housing when the piston reciprocates in the cylinder, the housing including a first part secured to the piston wall and a second part secured to the first part, a first magnet section of a magnet mounted in the first housing part and a second magnet section of the magnet magnetically coupled to the first magnet section and mounted in the second housing part, and an electric circuit operatively coupled with the second magnet section for generating electrical signals responsive to movement of the element past the housing and mounted in the second housing part only, whereby contamination at an interface between the first and second housing parts is prevented from degrading the electrical signals generated in the electric circuit.

12. An internal combustion engine according to claim 11 wherein the magnet sections define a generally U-shaped magnet, the first magnet section being formed by first and second magnetic limbs fixed in the first housing part and terminating in magnetic limb ends located proximate the element when it passes the sensor as the piston reciprocates in the cylinder.

13. An internal combustion engine according to claim 12 wherein the magnetic limbs converge towards the free limb ends.

14. An internal combustion engine according to claim 11 including means for releasably securing the first and second housing parts to each other so that the electric circuit can be separated from the first housing part.

* * * * *